(12) United States Patent
LoFaro et al.

(10) Patent No.: US 8,703,630 B2
(45) Date of Patent: Apr. 22, 2014

(54) RESIN-SOLUBLE THERMOPLASTIC VEIL FOR COMPOSITE MATERIALS

(75) Inventors: Carmelo LoFaro, La Punta (IT); Abdel Abusafieh, Anaheim, CA (US); William Erwin Webb, Placentia, CA (US); Marc Doyle, Paris (FR)

(73) Assignee: Cytec Technology Corp, Wilmington, DE (US)

( * ) Notice: Subject to any disclaimer, the term of this patent is extended or adjusted under 35 U.S.C. 154(b) by 462 days.

(21) Appl. No.: 11/429,765

(22) Filed: May 8, 2006

(65) Prior Publication Data

US 2006/0252334 A1    Nov. 9, 2006

Related U.S. Application Data

(60) Provisional application No. 60/679,114, filed on May 9, 2005.

(51) Int. Cl.
| | |
|---|---|
| *B32B 5/26* | (2006.01) |
| *B32B 27/04* | (2006.01) |
| *B32B 3/00* | (2006.01) |
| *B32B 5/08* | (2006.01) |
| *B32B 27/12* | (2006.01) |

(52) U.S. Cl.
USPC ............ 442/278; 442/59; 442/63; 442/181; 442/251; 442/268; 442/269; 442/58; 428/295.1; 428/295.4; 428/297.1; 428/297.4; 428/298.1; 428/299.7; 428/300.4; 428/300.7; 428/301.4

(58) Field of Classification Search
USPC ............. 428/113, 114, 295.1, 295.4, 299.1; 442/59–181, 354, 406, 414, 415
See application file for complete search history.

(56) References Cited

U.S. PATENT DOCUMENTS

| | | | |
|---|---|---|---|
| 3,018,290 | A | 1/1962 | Savers et al. |
| 3,018,292 | A | 1/1962 | Savers et al. |

(Continued)

FOREIGN PATENT DOCUMENTS

| | | | | |
|---|---|---|---|---|
| EP | 0 365 168 A3 | 4/1990 | ............. | C08L 81/06 |
| EP | 0 486 197 A2 | 5/1992 | ............. | C08L 79/08 |

(Continued)

OTHER PUBLICATIONS

Textile Glossary definition of Nonwoven, Celanese Acetate, copyright 2001.*

(Continued)

*Primary Examiner* — Jennifer A Steele
(74) *Attorney, Agent, or Firm* — David LeCroy

(57) ABSTRACT

A resin-soluble thermoplastic polymer veil toughening element for a curable composition wherein the polymer element is a non-woven veil in solid phase adapted to undergo at least partial phase transition to fluid phase on contact with a component of the curable resin matrix composition in which it is soluble at a temperature which is less than the temperature for substantial onset of gelling and/or curing of the curable composition and which temperature is less than the polymer elements melt temperature; a method for the preparation thereof, a preform support structure for a curable composition comprising the at least one thermoplastic veil element together with structural reinforcement fibers, methods for preparation thereof, a curable composition comprising the at least one thermoplastic veil element or the support structure and a curable resin matrix composition, a method for preparation and curing thereof, and a cured composite or resin body obtained thereby, and known and novel uses thereof.

18 Claims, 6 Drawing Sheets

(56) References Cited

U.S. PATENT DOCUMENTS

| | | | | |
|---|---|---|---|---|
| 3,627,780 | A | 12/1971 | Bonnard et al. | 260/326 |
| 3,770,691 | A | 11/1973 | McLaughlin et al. | 260/37 |
| 3,839,358 | A | 10/1974 | Bargain et al. | 260/326.26 |
| 4,377,657 | A | 3/1983 | Street et al. | 524/424 |
| 4,413,107 | A | 11/1983 | Locatelli | 526/262 |
| 4,741,073 | A | 5/1988 | Capen | 16/114 |
| 5,057,353 | A | 10/1991 | Maranci et al. | 428/147 |
| 5,288,547 | A | 2/1994 | Elmes et al. | 428/308 |
| 6,027,794 | A * | 2/2000 | Ozaki et al. | 428/297.7 |
| 6,060,147 | A | 5/2000 | Kim et al. | 428/113 |
| 6,437,080 | B1 | 8/2002 | McGrail et al. | 528/171 |
| 2004/0041128 | A1 * | 3/2004 | Carter et al. | 252/500 |

FOREIGN PATENT DOCUMENTS

| | | | |
|---|---|---|---|
| EP | 0 392 939 B1 | 6/1994 | D03D 11/00 |
| EP | 0 327 142 B1 | 1/1996 | B32B 27/12 |
| EP | 0 311 349 B1 | 9/1996 | C08L 81/06 |
| EP | 0 842 038 B1 | 10/2001 | B29C 70/24 |
| EP | 1 473 132 A2 | 11/2004 | |
| GB | 2 060 490 A | 5/1981 | |
| JP | 2000119952 A2 | 4/2000 | D01F 6/62 |
| WO | PCT/GB95/01303 | 12/1995 | C08G 59/38 |
| WO | WO 03/038175 A | 5/2003 | D04H 13/00 |

OTHER PUBLICATIONS

U.S. Appl. No. 10/381,540, filed Mar. 25, 2003, Woolstencroft, et al.

* cited by examiner

| PROPERTY | WITHOUT RESIN-SOLUBLE VEIL | WITH RESIN-SOLUBLE VEIL |
|---|---|---|
| $G_{1C}$ (In.lbf/in2) | AVG = 1.72<br>S.D. = 0.063 | AVG = 6.70<br>S.D. = 0.603 |
| $G_{2C}$ (In.lbf/in2) | AVG = 5.56<br>S.D. = 0.665 | AVG = 19.95<br>S.D. = 0.573 |
| CAI (MPa) | AVG = 203.75<br>S.D. = 8.15 | AVG = 272.39<br>S.D. = 10.05 |

FIG.2

RESIN-SOLUBLE THERMOPLASTIC VEIL FOR COMPOSITE MATERIALS

This application, Ser. No. 11/429,765, claims priority to the provisional application 60/679,114 filed May 9, 2005. Related cases, PCT/US06/17604 and PCT/US06/17915 also claim priority to the provisional application 60/679,114.

BACKGROUND OF THE INVENTION

1. Field of the Invention

This invention relates to the manufacture and use of non-woven thermoplastic veils for use in complex and diverse high performance composite applications. In preferred embodiments, this invention relates to a resin-soluble thermoplastic polymer formed into a non-woven veil fabric or random mat for incorporation into high performance composite manufacturing applications to aid part manufacturing and improve desired properties.

2. Description of the Related Art

Fiber-reinforced resin matrix composites are widely accepted for use as high strength low weight engineering materials to replace metals in aircraft structural applications and the like. These curable compositions may be made by laminating prepregs comprising high strength fibers, such as glass, quartz, graphite (carbon), boron, aramid or the like impregnated with an epoxy resin matrix. Important properties of such composites are high strength and stiffness with reduced weight.

Curable compositions comprising a blend of polymer resins and reinforcing fibers are characterized by individual physical and chemical properties of the constituent polymer resins and fibers, whereby compositions may be selected for a specific use. Typically, therefore a thermoset resin component is present which confers high solvent resistance, thermal cycling resistance, etc. In addition, a thermoplast resin component may be present to confer higher levels of toughness, fire resistance, etc, and reinforcing fibers to confer high levels of stiffness, strength, etc.

Composites are traditionally made using curable compositions known as prepregs made up of fiber reinforcements or structural fabrics impregnated with a resin matrix. Sheets of prepreg may be cut to size for laying up and molding and laminating in the construction of a given composite structure. Prepreg properties and resulting part quality can be controlled to manipulate resulting part properties such as toughness, strength, flexibility and the like.

Prepregs traditionally contain epoxy resins impregnated on fiber reinforcements. Should the resulting part require enhanced properties such as additional toughness, additives such as thermoplastics may be added to the epoxy resin. However, use of prepregs results in certain disadvantages including labor costs, difficulty in forming complex shaped parts, controlling toughened locations, and increased manufacturing costs due to the use of automated tape laying or fiber placement equipment and autoclaves for curing.

Recently there has been an emergence of an alternative technology for manufacturing composite parts, which technology is generally referred to as resin infusion. This approach differs from that of conventional prepreg technology in that dry structural reinforcement fibers are arranged in a mold as a preform, which consists of one or more layers or plies of dry oriented structural reinforcement fiber material assembled in a stack. Then the preform is then injected or infused directly in-situ with the resin matrix.

Resin infusion is a generic term which covers processing techniques such as Resin Transfer Molding (RTM), Liquid Resin Infusion (LRI), Vacuum Assisted Resin Transfer Molding (VARTM), Resin Infusion with Flexible Tooling (RIFT), Vacuum Assisted Resin Infusion (VARI), Resin Film Infusion (RFI), Controlled Atmospheric Pressure Resin Infusion (CAPRI), VAP (Vacuum Assisted Process) and Single Line Injection (SLI).

The potential benefits that resin infusion has to offer over that of a conventional prepreg route are reduced scrap, reduced lay-up time, reduced capital cost, a non-dependence on tack and drape and increased shelf life properties. In practice, the use of resin infusion technology finds its greatest use in specialized operations requiring complex composite structures, localized toughening, and very large structures, such as in aircraft wings and fuselages, marine or wind applications.

When the preform is placed in a mold, the layers or plies are typically held in place, stabilized and compacted/debulked, by stitching, stapling or bonding using binders and tackyfiers. These operations maintain the orientation of the fibers and to stabilize the preform in order to maintain the geometry and the dimensions of the preform and to prevent fraying or the pulling apart of the dry perform during storage, transport and handling.

The preform may then be carefully cut outside of the stitching or stapling to a desired shape. The preform is then placed in a mold and resin injected to impregnate the fabric. The infused preform is then cured by ordinary and accepted procedures to provide a finished composite structure.

However, stitching and stapling for preform stabilization are typically limited as the preform cannot be shaped to conform to a complex structure's contour without disturbing the stitching or stapling.

One means of overcoming the stitching problem has been through the use of weaving a thermoplastic into the structural reinforcement fibers, which thermoplastic will melt when slightly heated to stabilize the preform, and then will melt into the epoxy resin matrix during cure. See U.S. Pat. No. 4,741,073, for example. However, this practice is limited in the amount of thermoplastic that can be added, requires high processing temperatures to ensure complete melting of the thermoplastic into the epoxy resin matrix.

While resin infusion technology is promising, composites which have high impact requirements usually contain thermoplastic toughening agents and it is difficult to add a thermoplastic toughening agent to an injectable resin because thermoplastic toughening agents possess such high molecular weight that they greatly increase the viscosity of the resin. Therefore, only small amounts of a thermoplastic toughening agent can be added to the resin of these resin infusion systems.

A potential way to efficiently provide thermoplastic toughening agents for a resin infusion system is to not add the thermoplastic to the resin, and to introduce it in some other way to the preform. In the case of resin infusion technology, one means of overcoming this limitation has been by introducing the thermoplastic polymer by weaving it directly into the carbon fibers.

EP 392939 discloses a method of preparing a traditional prepreg with reinforcing fibers co-woven with thermoplastic fibers which melt. These systems do not however attempt to introduce an additional resin matrix into the prepreg, as in resin infusion systems, and typically employ very high molecular weight thermoplastic polymers, which require excessively high temperature and pressure to melt.

One early attempt at incorporating a thermoplastic fiber into carbon fiber fabric for resin infusion is disclosed in U.S. application Ser. No. 10/381,540. This application discloses the use of a thermoplastic fiber woven within the structural reinforcement fiber for use in a resin infusion preform system.

However, this application discloses that the thermoplastic fibers remain in the final composite, after curing of component, i.e., the thermoplastic fibers do not dissolve in the resin.

A related attempt to overcome these issues in resin infusion technology is to provide a preform which introduces a flexible thermoplastic polymer fiber with the reinforcing fibers by weaving the thermoplastic polymer fiber with the reinforcing fibers. The flexible thermoplastic polymer fiber is in a solid phase and adapted to undergo at least partial phase transition to fluid phase on contact with a resin matrix component of the curable composition at a temperature that is less than cure temperature for the curable composition and which is less than the melting temperature of the flexible thermoplastic polymer fiber. See published US Patent Application No. US 20040041128 assigned to Cytec Technologies, Inc. and published Mar. 4, 2004.

While this method of co-weaving a thermoplastic fiber with the reinforcement fibers overcomes many of the problems of traditional resin infusion technology, it does not provide the capability of localized toughening. The thermoplastic fibers are woven throughout the reinforcement fibers and such that there is an even distribution of fibers and resulting even concentration of thermoplastic throughout the composite part. Therefore, this method has limited flexibility in the amount of added thermoplastic polymer that may be incorporated into the composite part. There is no provision in this co-weaving technology to concentrate additional amounts of thermoplastic polymer for increased toughening at a particular location of the composite part.

Additionally, reinforcement fiber fabrics co-woven with thermoplastic fibers concentrate the thermoplastic toughening agent predominantly within the same plane as the reinforcement fibers rather than between layers where it may be more preferred. The toughening agent is preferred to be primarily situated between structural reinforcement fiber layers, rather than within, to carry the higher stresses incurred between the reinforcement fiber layers of the final composite.

Moreover, the thermoplastic fibers are not practically able to be added to unidirectional tape due to the high tension required to manufacture unidirectional carbon fiber tape.

The incorporation of the thermoplastic toughening agent as a fiber co-woven into the structural reinforcement fiber further led to some difficulties in controlling amount of thermoplastic toughening agent in the resin. This control is preferred in order to match data for current resin formulations containing precise amounts of thermoplastic toughening agent. In order to obtain the appropriate amount of thermoplastic polymer, the number of thermoplastic fibers and uniformity of distribution throughout the structural reinforcement preform had to be controlled. The number, size and placement of the thermoplastic fibers within the preform had to be controlled to allow for the uniform distribution of the thermoplastic polymer to result in the duplication of current toughened resin formulations.

The co-weaving method also results in increased manufacturing costs due to the requirement of spinning the thermoplastic polymer into a fiber capable of being woven with the structural reinforcement fibers. Moreover, the added complexity of co-weaving a dissimilar material such as a thermoplastic fiber with the structural reinforcement fibers increased manufacturing costs.

Additionally, co-weaving of the thermoplastic fiber disturbed the arrangement and straightness of the structural reinforcement fibers, thus reducing in-plane mechanical properties and did not afford the interlaminar toughening that was desired of composite systems. In other words, the thermoplastic polymer is preferred to be concentrated more highly between the structural reinforcement fiber layers rather than within.

A modified attempt to overcome these shortcomings of co-woven toughened resin infusion systems has been to interpose thermoplastic interleaf layers between reinforcement structural fiber layers. See U.S. Pat. Nos. 6,437,080B1, 5,288,547, EP 1 473,132 A2 and EP 0327,142 A. However, this interleaf toughening material does not dissolve into the resin, but rather melts at the higher temperatures attained during cure providing limited diffusion and requiring higher temperatures and cure times to advance the melting and diffusion.

Melting interleaf layers are limited in that it is difficult to manufacture quality components by RIFT or VARTM, out of the autoclave, without the benefit of high temperatures and cure times needed to advance the melting and diffusion in these systems. Curing with vacuum only or with no pressure causes the components to have very high void content thus, leading to poor mechanical properties.

Melting interleaf systems are further limited in that the lack of uniform and complete dissolution creates interfaces between the resin and reinforcement fibers. This interface can in turn decrease composite resistance to fluids and cause a reduction in hot/wet mechanical properties. Furthermore, the lack of complete dissolution of the thermoplastic and the resin means that no synergy between the properties of the two chemical species can be obtained; for example the resin will maintain its brittleness and the thermoplastic will remain sensitive to solvents.

Other means of incorporating thermoplastic tougheners into resin infusion systems include powder coating the dry fibers or the fabric with a particulate thermoplastic material such that when the dry fibers or the fabric are laid up, slight heating of the fibers melts the particulate thermoplastics and fuses and stabilizes the plies. Additionally, the thermoplastic particles melt at the cure temperature and diffuse into the resin system, toughening the matrix. However, melting and diffusion of these thermoplastics into the resin matrix also requires the high temperature curing processes and is limited in the amount and extent of diffusion of the thermoplastic. See U.S. Pat. No. 5,057,353 which uses thermoplastic particles on the surface of the resin infused prepregs to add toughening properties. This system is an epoxy resin impregnated prepreg rather than a coated dry fiber applicable for resin infusion. Furthermore, the thermoplastic particles are intended to melt upon curing and do not dissolve prior to attaining higher cure temperatures necessary to melt them. Another disadvantage of particle toughening is that during resin infusion, the particles can be washed away by the resin flow and can uncontrollably agglomerate at undesirable locations. This causes the mechanical properties of the composites to be not uniform and may cause undesirable voidage and porosity due to varying viscosities of the resin causing a non-homogeneous flow front.

Other methods of incorporating thermoplastic particles or fibers into reinforcement structural fibers are disclosed in EP 0842038 B1; WO 03/038175 A1; JP 2000119952 A2 and U.S. Pat. No. 6,060,147.

However, localized toughening of composites remains difficult using these techniques during manufacture because the toughening agent is uniformly coated onto the reinforcement fibers and cannot be controllably increased in any particular area of the part that may require increased toughness.

It has been proposed to use hybrid matrix thermosetting resins including a high molecular weight thermoplastic polymer, as a particulate dispersion as disclosed for example in GB-A-2060490, or as a particulate coating or film interleave of the fiber-reinforced matrix resin prepregs as disclosed in U.S. Pat. No. 5,057,353. Nevertheless dispersion is typically poor due to difficulty in controlling distribution of particles and uniformity of particle size which can influence rate and degree of melting, and the barrier effect of a continuous film during resin infusion.

U.S. Pat. No. 5,288,547 discloses prepregs for curable compositions comprising a porous thermoplastic polymer membrane interleave. The membrane is laid up against a sheet of reinforcing fiber and melting at elevated temperature and pressure to impregnate the fibers; alternatively prepreg is laid up with membrane between and melted to impregnate prior to curing to form a composite part; alternatively the membrane proposed for RTM application is laid up between layers of dry fiber in a mold, melted to impregnate, and liquid resin injected into the mold.

While these technologies go some way to alleviating the problems associated with thermoplastic toughened resin infusion systems, there is still a need for a more versatile solution with more flexibility and control of nature and amount of toughening agent and increased performance properties. Specifically, the need for an improved means of incorporating and controlling the amount of thermoplastic toughener in a resin infusion system remains unsatisfied. Indeed, there remains a need to introduce greater amounts of thermoplastic polymers for toughening into the system.

SUMMARY OF THE INVENTION

The present invention surprisingly overcomes the problems of prior prepreg and resin infusion systems. A preferred embodiment of the present invention comprises a non-woven veil of resin-soluble thermoplastic interposed between plies of dry structural reinforcement fiber for resin infusion to enhance inter-laminar toughness and other properties such as flame, smoke and toxicity (FST), and preforming capabilities.

In the broadest aspect of the present invention there is provided a resin-soluble thermoplastic element for a curable composition adapted to be interposed between layers of structural reinforcement fibers wherein the resin-soluble thermoplastic polymer is in a solid phase and adapted to undergo at least partial phase transition to a fluid phase on contact with a component of the curable composition in which it is soluble, at a temperature which is less than the temperature for substantial onset of gelling and/or curing of the curable composition and which temperature is less than the inherent melting temperature of the resin-soluble thermoplastic element.

The present invention relates to a resin-soluble thermoplastic element for use in a curable composition wherein the element is adapted to dissolve in the curable composition; a method for the preparation thereof; a support structure or carrier for a curable composition comprising the at least one resin-soluble thermoplastic element together with reinforcing fibers, configurations of support structures and carriers, methods for preparation thereof, a curable composition comprising the at least one resin-soluble thermoplastic element or the support structure or carrier and a curable resin matrix; a kit of parts comprising the components thereof and a method for selection thereof, a method for preparation and curing thereof; and a cured composite or resin body obtained thereby, and known and novel uses thereof.

The present invention is exceptionally suited for resin infusion systems in that it provides the thermoplastic toughening component in virtually any amount desired through the placement of the thermoplastic element onto the dry fibers, or interposed between layers thereof, with additional thermoplastic toughening material not required within the epoxy resin being infused.

Furthermore the permeable nature of the resin-soluble thermoplastic veil of the present invention provides more uniform flow and delivery of matrix resin throughout the preform than other thermoplastic films, which are not permeable.

Furthermore, the present invention utilizes thermoplastic polymers that are soluble within a resin system, thus allowing for more uniform distribution into the resin matrix than insoluble, meltable thermoplastics. Additionally, as the thermoplastic polymer of the present invention does not require high temperatures to melt in order to diffuse into the resin matrix, high processing temperatures are not required and out of autoclave manufacturing is possible.

A preferred embodiment of the present invention is a non-woven veil comprising a polyaromatic resin-soluble thermoplastic fiber compatible with epoxy resin matrices.

A preferred embodiment of the present invention provides a non-woven veil of resin-soluble thermoplastic adapted to incorporate modifiers such as additives, curing agents, metal flakes and powders, hard and soft particles, fire retardants, nanoparticles, etc, that cannot be readily incorporated in a standard resin.

A preferred embodiment of the present invention comprises a curable resin matrix and a resin-soluble non-woven thermoplastic veil for toughening, together with optional additional toughening agents, reinforcing fibers, catalysts, curing agents, additives, fillers and the like.

A further aspect of the present invention is its ability to provide localized toughening of a composite. The present invention has the ability to lay up additional layers of thermoplastic toughening fabric in the areas requiring additional toughening.

A further aspect of the present invention is its ability to provide stabilization to a preform structure. A preferred embodiment interposes the resin-soluble thermoplastic veil between adjacent plies of, and in contacting relation to, structural reinforcement fibers in a preform; heating the preform sufficiently to soften the resin-soluble thermoplastic veil fibers in contact with the structural reinforcement fibers; allowing the thermoplastic fibers to at least partially adhere to the structural reinforcement fibers; and cooling the preform to solidify and harden the thermoplastic fibers to stabilize.

A further aspect of the present invention is that the resin-soluble thermoplastic polymer element may be present as a film in the form of an interleaf, with resin matrix film, or as a permeable or foamed film impregnated with resin matrix or the like.

A preferred embodiment of the present invention includes a method of manufacturing a non-woven resin-soluble thermoplastic veil comprising the steps of heat blow extruding a resin-soluble thermoplastic polymer into a plurality of fibers onto a mandrel and cooling the resulting random veil. Alternatively, the fibers may be chopped into a plurality of thermoplastic pieces of lengths from about 0.01 inches to about 15 inches; the pieces scattered onto a mandrel heated to between about 100° C. and 370° C., and cooling the veil.

A further preferred embodiment of the present invention involves a toughening fabric for composites comprising a plurality of resin-soluble thermoplastic threads randomly adhered to one another into a porous fabric sheet.

A further preferred embodiment of the present invention involves a composite manufactured using a resin-soluble thermoplastic non-woven veil.

The present invention is further characterized as capable of being made from continuous, staple or chopped fibers.

The present invention is further characterized as capable of being made in the form of a fiber, film, non-woven mat or veil or the like.

The resin-soluble thermoplastic polymer element is preferably characterized as capable of being drawn from a laminating type machine without damaging the product.

The resin-soluble thermoplastic polymer of the present invention is characterized as soluble in any thermoset resin (vinylester, polyester, phenolic, epoxy, bismaleimides, cyanate esters), preferably soluble in epoxy and cyanate esters.

A further aspect of the present invention is that it is adapted for use with a curable resin matrix that includes at least one thermoplastic polymer, the curable resin matrix providing elevated levels of thermoplastic polymer wherein the thermoplastic polymer is present in a first amount in fluid phase as a curable resin matrix component and additionally is present in a second amount in the form of at least one resin-soluble thermoplastic polymer element in solid phase.

The present invention surprisingly finds that it is possible to provide elevated levels of a thermoplastic polymer adaptable to a resin infusion system, or the like by providing a part thereof as a resin-soluble thermoplastic polymer element in the form of a fiber, non-woven veil, mat, film, or the like capable of dissolving in a curable resin matrix, whereby it may be controllably combined in a curable resin matrix by means of at least partial phase transition as herein before defined to provide a polymer blend having desired properties.

BRIEF DESCRIPTION OF THE DRAWINGS

FIG. 2 illustrates data supporting the improved toughness of a composite manufactured using the present resin-soluble thermoplastic veil for a resin infused composite part.

DETAILED DESCRIPTION OF THE PREFERRED EMBODIMENTS

Figure 1:
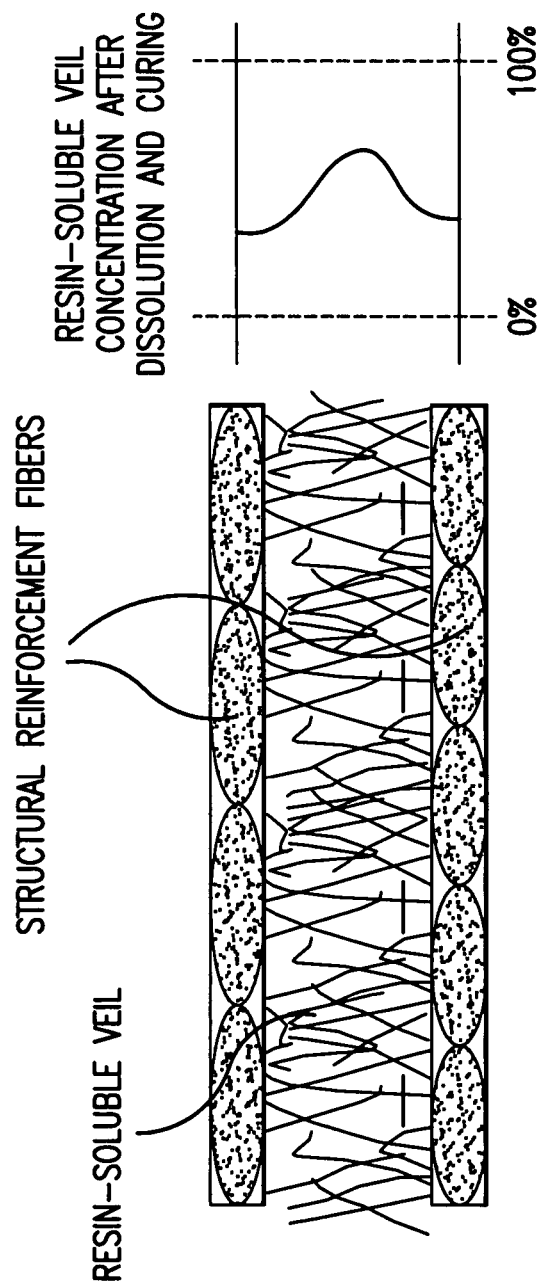
FIG. 1 illustrates the concentration gradient of the toughening element of the present invention interposed between plies of structural reinforcement fibers after diffusing into the curable resin that may be controlled to provide a higher concentration of toughening material where it is most preferred, between the structural reinforcement fiber plies.

By the term resin infusion is meant the method of introducing or injecting a curable resin matrix into a reinforcement fiber substrate, structural fabric or preform for composite part manufacture.

By the term resin-soluble thermoplastic polymer element, thermoplastic fiber, or polymer fiber is meant any flexible polymer element which is both chemically and physically adapted to at least partially dissolve in a curable resin matrix making up the curable composition, at a first temperature, that is less than the melt temperature of the resin-soluble thermoplastic polymer, wherein the resin-soluble thermoplastic polymer is at least partially dispersed into the curable resin matrix as a common phase by dissolution whereby it loses, at least partially, its physical element form to the curable composition, and whereby the resin-soluble thermoplastic reacts with the curable resin matrix at a second, chain linking, temperature to cross-link with the curable resin matrix. These thermoplastic fibers may be adapted to a non-woven veil or mat.

By the term method of manufacturing is meant a means for forming a non-woven veil by the arrangement of chopped or continuous fibers into a sheet, web, veil, mat or the like. The fibers can be chopped fibers, staple fibers packed in bales or continuous filaments extruded from molten polymer granules or pellets.

By the term flow temperature is meant the temperature at which the resin-soluble thermoplastic polymer and curable resin matrix attain a suitably fluid state to enable a degree of polymer chain mobility. Preferably the flow temperature corresponds to a solution temperature at which the resin-soluble thermoplastic polymer dissolves and which temperature is less than a chain linking temperature.

By the term chain linking temperature is meant a temperature at which a resin-soluble thermoplastic polymer chain linking reaction may be initiated. Preferably the chain linking temperature is higher than the resin-soluble thermoplastic polymer dissolution temperature. Preferably the chain linking temperature corresponds to the gelling or coalescence temperature of the curable matrix resin.

By the term reinforcing fibers is meant structural or stabilizing fibers that are insoluble fibers as known in the art which stiffen composites, such as organic or inorganic polymer, carbon, glass, quartz, aramid, PBO, polyethylene, inorganic oxide, carbide, ceramic, boron or metal and the like fibers. Poly {2,6-diimidazol [4,5-b: 4's'-e] pyridinylene-1,4(2,5-dihydroxy) phenylene} (PIPD commercially available from AkZO Nobel Central Research, The Netherlands), graphite and basalt.

By the term preform is meant to be any number of physical presentations such as in the form of a support structure or preform as known in the art.

By the term epoxy resin matrix is meant the curable resin matrix for resin infusion systems that is introduced by injection, infusion or the like into a preform to manufacture a composite part.

The present invention is a resin-soluble thermoplastic element for a curable composition adapted to be interposed between layers of reinforcement fibers wherein the resin-soluble thermoplastic element is in a solid phase and adapted to undergo at least partial phase transition to a fluid phase on contact with a component of the curable composition in which it is soluble, at a temperature which is less than the temperature for substantial onset of gelling and/or coalescence of the curable composition and which temperature is less than the inherent melting temperature of the resin-soluble thermoplastic element.

The resin-soluble thermoplastic element for a curable composition is preferably in the form of a veil. The resin-soluble thermoplastic veil shall have a preferred areal weight of about 2 to about 150 grams per square meter (gsm), and most preferably between about 5 and about 50 gsm. The resin soluble thermoplastic veil shall have a preferred real weight range of ±20% on nominal and most preferably of ±10% on nominal real weight.

The permeability of the resin-soluble thermoplastic veil of the present invention provides more uniform flow and delivery of curable resin matrix throughout a preform than traditional thermoplastic films which are not porous.

The resin-soluble polymer may be present in the form of an interleaf film.

The veil of the present invention is preferably comprised of a random mat of continuous or chopped polymer fibers that have a diameter of about 0.1 to about 100 microns and preferably between about 1.0 and about 50 microns.

The resin-soluble thermoplastic polymer of the present invention is selected from the group consisting of rubber, elastomeric polymers, thermoplastic polymers and combinations thereof. Preferably, the polymer is a thermoplastic polymer and more preferably it is an amorphous thermoplastic polymer or a crystalline polymer having a relatively low melting point, but generally in excess of about 300° F.

More particularly, the resin-soluble thermoplastic polymer according to the present invention can be any type of resin-soluble fibrous thermoplastic toughening material such as cellulose derivatives, polyester, polyamide, polimide, polycarbonate, polyurethane, poly(methyl methacrylate), polystyrene, polyaromatics; polyesteramide, polyamideimide, polyetherimide, polyaramide, polyarylate, polyacrylate, poly (ester) carbonate, poly(methyl methacrylate/butyl acrylate), polysulphone, polyethersulphone, polyetherethersulphone polyethersulphone-etherketone, and copolymers and combinations thereof. Preferably the thermoplastic toughening material is a polyethersulphone or polyetherethersulphone polyethersulphone-etherketone.

More preferably, the resin-soluble thermoplastic polymer comprises a polymer preferably having a number molecular weight from about 1000 to about 60,000, more preferably in the range of from about 2,000 to about 20,000.

Examples of suitable thermoplastic polymers include, but are not limited to members of the group consisting of cellulose derivatives, polyester, polyamide, polyimide, polycarbonate, polyurethane, poly(methyl methacrylate), polystyrene, polyaromatics; polyesteramide, polyamideimide, polyetherimide, polyaramide, polyarylate, polyacrylat, poly (ester) carbonate, poly(methyl methacrylate/butyl acrylate), polysulphone, polyethersulphone, polyetherethersulphone polyethersulphone-etherketone, and copolymers and combinations thereof.

A particularly preferred polyaromatic thermoplastic polymer for use as the fiber in the present invention preform is a polyaromatic sulphone comprised of ether-linked repeating units or thioether-linked repeating units, the units being selected from the group consisting of

—(PhAPh)$_n$— and

—(Ph)$_a$— wherein A=CO or SO$_2$, Ph is phenylene, n=1 to 2 and can be fractional, a=1 to 4 and can be fractional, with the proviso that when a exceeds 1, the phenylenes are linked linearly through a single chemical bond or a divalent group other than —CO— or —SO$_2$— or are fused together directly or via a cyclic moiety selected from the group consisting of an acid alkyl group, a (hetero) aromatic, a cyclic ketone, a cyclic amide, an imide, a cyclic imine and combinations thereof. Preferably, the polyaromatic sulphone comprises polyethersulphone (PES) and more preferably, a combination of polyethersulphone-etherketone and of polyether ether sulphone linked repeating units (PES:PEES), in which the phenylene group is meta- or para-; wherein the phenylenes are linked linearly through a single chemical bond or a divalent group other than sulphone, or are fused together. The preferred relative proportions of the repeating units of the polyarylsulphone in the PEES:PES may be expressed in terms of the weight percent SO$_2$ content defined as 100 times (weight of S0$_2$)/(weight of average repeat unit). The preferred SO$_2$ content is at least about 35, more preferably at least about 30 and most preferably at least about 22%. When a=1 this corresponds to PES/PEES ratio of at least 20:80, preferably in the range 25:75 to 75:25 and most preferably 35:65 to 65:35.

Alternatively, when the thermoplastic polymer for use as the fiber is polyurethane, it is more preferably a thermoplastic polyurethane rubber and when the fiber is a polyacrylate, the polyacrylate is at least 85 wt % acrylonitrile. When the thermoplastic polymer is a polyamide, it is preferably a nylon material and more preferably an amorphous nylon.

The polymer may be characterized by a range of Molecular Weight (MW) which may typically be defined either by number average molecular weight (Mn), peak MW and other means, usually determined by NMR and GPC. Preferably the polymer is selected in the range up to 70,000 for example 9000-60,000 for toughening, and in this case the Mn of the polyaromatic is suitably in the range 2000 to 25000, preferably 2000 to 20000, more preferably 5000 or 7000 to 18000, most preferably 5000 or 7000 to 15000.

The polyaromatic is preferably of relatively low molecular weight. It also preferably contains in-chain, pendant or chain-terminating chemical groups which are capable of self-assembling to form higher molecular weight complexes through non covalent bonds with similar or different chemical groupings in the polymer. These maybe, for example, hydrogen bonds, London forces, charge transfer complexes, ionic links or other physical bonds. Preferably the non-covalent bonds are hydrogen bonds or London forces which will dissociate in solution to regenerate the relatively low molecular weight precursor polyaromatic. The polyaromatic preferably contains pendant or chain-terminating groups that will chemically react with groups in the thermosetting resin composition to form covalent bonds. Such groups may be obtained by a reaction of monomers or by subsequent conversion of product polymer prior to or subsequently to isolation. Preferably groups are of formula:

—A'—Y where A' is a divalent hydrocarbon group, preferably aromatic, and Y is a group reactive with epoxide groups or with curing agent or with like groups on other polymer molecules.

Examples of Y are groups providing active hydrogen especially OH, NH$_2$, NHR' or —SH, where R' is a hydrocarbon group containing up to eight (8) carbon atoms, or providing other cross-linking reactivity especially epoxy, (meth)acrylate, cyanate, isocyanate, acetylene or ethylene, as in vinyl allyl or maleimide, anhydride, oxazaline and monomers containing saturation. Preferred end groups include amine and hydroxyl.

A particular advantage is that the polymer element may have low molecular weight, but be adapted to react on curing to provide the higher molecular weight required for effective toughening or the like. Specifically the polymer may comprise chains of at least one aromatic polymer or a mixture thereof together with at least one chain linking component wherein the at least one aromatic polymer comprises polymer chains in a first range of 2000 to 11000 Mn, especially 3000 to 9000 Mn and characterized by a polymer flow temperature, and wherein one of the at least one polyaromatic and the at least one chain linking component comprises at least one reactive end group and the other comprises, at least two linking sites reactive end groups Y and chain linking sites, Z are selected OH, $NH_2$, NHR or SH wherein R is a hydrocarbon group containing up to eight (8) carbon atoms, epoxy, (meth)acrylate, (iso)cyanate, isocyanate ester, acetylene or ethylene as in vinyl or allyl, maleimide, anhydride, acid, oxazoline and monomers containing unsaturation characterized in that a plurality of the end groups are adapted to react with the linking sites at chain linking temperature in excess of the polymer flow temperature to form linked polymer chains in a second range of 9000 to 60000 Mn, especially 11000 to 25000 Mn, which is in excess of the first range, substantially thermoplastic in nature.

The fiber characteristics include, but are not limited to yarns or monofilaments of spun strands, extruded strands, cast strands, continuous fibers, random fibers, staple fibers, discontinuous fibers, chopped fibers, whiskers, filaments, ribbons, tapes, hollow fibers, veils, fleeces, and combinations thereof.

The fiber may be both a yarn made up of multiple monofilaments or single and multiple monofilaments. Preferably the fiber (or yarn) comprises fibers each having a diameter less than or equal to about 100 micron. Preferably a fiber or filament has a diameter d, or is a film or ribbon having thickness t wherein d or t are in the range up to 100 micron, preferably from about 1.0 to about 80.0 micron, more preferably between about 10 and about 50 micron.

The thermoplastic veil should be provided in dimensions of about 1 inch to about 200 inches wide and preferably between about 20 inches and about 70 inches.

The fiber cross section can be a variety of different shapes to allow control of the wetting of the polymer fiber such as star, square, cauliflower or kidney bean shape as well as standard oval, circular and flat ribbons. Additionally, the fiber may be hollow or contain different materials in different concentric layers: for example, an inner core and an external shell. Preferably, the fibers are cylindrical in shape with a circular cross section for optimal surface area for dissolution.

The thermoplastic veil preferably comprises chopped fibers with an average length of about 10 microns to about 100 inches and preferably about 1 inch to about 20 inches.

The thermoplastic veil should at least partially maintain its solid phase while resin is infused into the system so as to not dissolve into the resin and increase the resin viscosity during infusion. Dissolution during resin infusion would impede the resin flow through the reinforcement fibers. More preferably the veil should not significantly or appreciably dissolve during resin infusion temperatures between 20° C. and about 90° C. or preferable resin infusion temperatures of between about 30° C. and about 65° C.

The thermoplastic veil should begin appreciable dissolution into the curable resin matrix above 90° C. with substantially complete dissolution occurring between about 90° C. to 175° C. with the preferred dissolution temperature being between about 120° C. and 140° C. and most preferably about 130° C.

The melting temperature of the resin-soluble thermoplastic element of the present invention is from about 175° C. to about 400° C. or greater and preferably between about 250° C. and 400° C. The particular melting temperature of the resin-soluble thermoplastic element is dependent upon the molecular weight of the particular thermoplastic employed.

The thermoplastic veil does not substantially react with the curable resin matrix system at the dissolution temperature.

The thermoplastic veil may further comprise a combination of more than one resin-soluble thermoplastic polymer in first or second amounts.

The methods of manufacturing the thermoplastic veil of the present invention include drylaying; airlaying; meltblowing/spunlaying/spunbonding; and wetlaying. Preferably the resin-soluble thermoplastic veil of the present invention is manufactured through meltblowing.

In the meltblowing manufacturing process, the resin-soluble thermoplastic polymer in powder form is melted at between about 250° C. and 400° C., preferably about 325° C. and extruded through a plurality of spinnerets. The orifice size of the spinneret is between about 0.1 microns to about 100 microns and preferably between about 1.0 microns and about 50 microns. Air in the temperature range of 350° C. to 500° C. is blown onto the fibers extruded onto a conveyor from the spinnerets to randomize the fibers into a veil.

The meltblowing process can use polymer powder or granules which are melted into a molten polymer that is extruded through the spinnerets. The continuous filaments are deposited onto a conveyer and cooled to form a uniform non-woven veil. Some remaining heat content of the soft filaments can cause the filaments to at least partially adhere to one another, but this cannot be regarded as the principal method of bonding the filaments to one another. This process has the advantage of giving the resulting non-woven veil a greater tensile strength and resistance to tearing or fraying during manufacture of the veil and during manufacture of a composite.

Co-extrusion of second thermoplastic polymer component is possible, usually to provide additional toughening properties, fire retardancy properties, bonding capabilities and the like.

The drylaying process is an alternate means of manufacturing the resin-soluble thermoplastic veil of the present invention and starts with the opening of bales of thermoplastic polymer fibers which are blended and conveyed to the next stage by air transport. The fibers are then combed into a veil by a carding machine, which is a rotating drum or series of drums covered in fine wires or teeth. The precise configuration of cards will depend on the fabric weight and fiber orientation required. The veil can be parallel-laid, where most of the fibers are laid in the machine direction, or they can be random-laid. Typical parallel-laid carded veils result in good tensile strength, low elongation and low tear strength in the machine direction and the reverse in cross direction. Relative speeds and veil composition can be varied to produce a wide range of properties.

The airlaying process is another method of drylaying. In airlaying, the fibers, which can be very short, are fed into an air stream and from there to a moving belt or perforated drum, where they can form a randomly oriented veil. Compared with carded veils, airlaid veils have a lower density, a greater softness and an absence of laminar structure. Airlaid veils offer great versatility in terms of the fiber blends that can be used.

In the wetlaying process, dilute slurry of water and fibers is deposited on a moving wire screen and drained to form a veil. The veil is further dewatered, consolidated, by pressing between rollers and dried. Wetlaid veil-forming allows a wide range of fiber orientations ranging from near random to near parallel. The strength of the random oriented veil is similar in all directions in the plane of the fabric.

A further method of manufacturing a non-woven resin-soluble thermoplastic fabric veil comprises the steps of heat blow extruding of the resin-soluble thermoplastic into a thread; chopping the thread into a plurality of thermoplastic pieces of lengths from about 10 microns to about 100 inches and preferably about 1 inch to about 20 inches; scattering the pieces onto a heated mandrel and cooling the veil.

Preferably polymers in the form of fibers or film are obtained by continuous extrusion of resin melt onto reels and film forming or spinning as known in the art of synthetic textiles manufacture by mechanical stretching with heating, more preferably by providing the polymer melt, drawing off in elemental shape, subjecting to a heating and mechanical stretching regime which may orient polymer chains and render the element elastomeric and predisposed to dissolution, and cooling, preferably by pulling in air for a desired distance, e.g. 50 to 500 mm. Preferably polymer melt is drawn off through a die head or the like providing a desired number of apertures or slots, using a pump with controlled pump rate for a desired linear density (tex) of polymer for example up to 180 tex.

The thermoplastic polymers may be prepared from micronized or unmicronized polymer, pellets, particles or other extrudate and the like. Preferably fibers are prepared as multifilaments of up to 20 same or different polymer filaments, which are drawn off from the molten polymer, cooled and optionally twisted as desired, and then subjected to heating and stretching. The multifilament is more resistant to breaking; there is a trade off between higher strength and lower flexibility in selection of filaments and twists/meter.

In a further aspect of the present invention there is provided a process for the preparation of a curable composition as known in the art comprising contacting a resin-soluble thermoplastic veil with a curable resin matrix for example by interleaving, impregnating, injecting or infusing, mixing and the like.

The composition may then be laid up with other component parts such as reinforcing fibers to provide the curable composition, or other composite parts such as metal or polymer or other bodies or structures prior to curing in known manner.

Another aspect of the present invention is for use as interleaves for introducing thermoplastics into the interlaminar region of conventional prepregs. The resin-soluble thermoplastic veils can also be utilized in dry preforms where the open weave structure optimally allows for the injection/infusion of the thermosetting curable resin matrix to occur throughout the preform. This is unlike the inclusion of continuous films which act as obstructions to the resin flow which in turn can lead to porosity and poor mechanical and environmental performance.

Another aspect of the present invention is for stabilization of performs and perform precursors. The present invention provides for the use of a resin-soluble thermoplastic veil to combine, bond, stabilize, debulk and preform structural fibers, fabrics, textiles and preforms by using a combination of time, temperature and pressure.

For the purposes of the present invention, the terms combine, bond, stabilize, debulk and preform are used to mean 1) the stabilization of fibers or single sheet, layer or ply or multiple sheets, layers or plies of structural fabric so that it can be moved, cut, transported, resin infused, or handled in a typical manner without fraying, unravelling, pulling apart, bending, wrinkling or otherwise distorting the integrity of the structural fabric, 2) the stabilization and binding together of multiple layers of reinforcing or structural fabrics for cutting, molding or shaping, by placing in a mold or otherwise so that the resulting preform will not be distorted by being moved, transported or manipulated in any way and so that the fibers that make up the structural fabrics remain intact during resin infusion, and 3) fixing a preform in a desired shape.

The stabilized preform according to the present invention comprises a veil according to the present invention comprising all of its characteristics and features, that has been subjected to a stabilizing temperature that is preferably suitable to soften the stabilizing fiber and is most preferably of from about 100° C. to about 250° C. for a time period from about 5 seconds to about 100 minutes or more.

The stabilized preform according to the present invention can typically comprise more than one layer of structural fabric. The layers or plies of structural fabric can be stacked, cut and shaped prior to having been subjected to a stabilizing temperature.

In the present process the heat can be applied in any manner and from any source, preferred examples including, but not being limited to heat sources selected from infrared, microwave, convection, induction, ultrasonic, radiant and combinations thereof. The heat should preferably be applied in an amount that is sufficient to soften the stabilizing fiber. More preferably the heat is applied at a temperature of from about 125° C. to about 185° C. for a time period of from about 1 min to about 100 min. The step of applying heat can be performed under a vacuum of from about 500 mbar to about 999 mbar or under pressure applied by using a press, nip rollers and the like.

Optionally, in the present process more than one layer of structural fabric can be provided. The process can then further comprise the steps of stacking and cutting the layers or plies of structural fabric after the step of integrating the stabilizing fiber into the structural fabric and before the step of applying heat. The present process can optionally further comprise the step of shaping the layers of structural fabric after the layers have been stacked and cut and before the step of applying heat In the present process, the step of integrating the resin-soluble veil into the structural fabric can be carried out by using any known method for integrating or incorporating a veil into a structural fabric, preferred examples of which include a method selected from punching, overwinding, intermeshing, aligning, hot compacting and combinations thereof.

The present invention also comprises a process for debulking a preform precursor comprised of reinforcing fibers for composite material manufacture. The process comprises the same steps utilized for stabilization in order to reduce the thickness of the stack. The step of applying heat is preferably performed under a vacuum of from about 500 mbar to about 999 mbar or under pressure applied by using a press, nip rollers and the like.

The process can further comprise the step of shaping the stack of structural fabric after the step of cutting and before the step of applying heat.

The resin-soluble thermoplastic fibers of the present invention and any reinforcing fibers are incorporated with the curable resin matrix at any suitable stage in the process.

The resin-soluble thermoplastic veil of the present invention can also carry modifiers such as additional toughening agents, additives, curing agents, metal flakes, fire retardants, nanoparticles, etc, that cannot be included in a standard resin matrix or adhesive.

Localized toughening of a composite is also uniquely possible through the present invention by providing a means for separately laying up additional layers of thermoplastic toughening fabric in the areas requiring additional toughening.

The resin-soluble thermoplastic veil is preferably capable of being combined with structural reinforcement fibers by being drawn from a laminating type machine without damaging the product.

The resin-soluble thermoplastic veil of the present invention is characterized as being compatible and complementary to a curable resin matrix system. In this regard the resin matrix may further comprise a compatible or complementary thermoplastic toughening material that is the same or different than the resin-soluble thermoplastic in the veil. The thermoplastic incorporated in the resin may be soluble or insoluble.

The resin-soluble thermoplastic polymer of the present invention is characterized as being soluble within the curable resin matrix. The polymer should have the ability to at least partially and preferably completely dissolve, (as opposed to melt) in the curable resin matrix, most preferably a curable resin matrix for infusing into a preform comprising reinforcement fibers and the present invention to manufacture the composite. The dissolution characteristic thus allows for more controlled distribution into the resin matrix than meltable thermoplastics.

Additionally, as manufacturing with the thermoplastic polymer does not require a high temperature to dissolve and diffuse the thermoplastic polymer into the resin matrix, high processing temperatures are not required and out of autoclave manufacturing is possible.

Dissolution should preferably occur at a dissolution temperature below that of the cure temperature for the resin and below the melt temperature of the polymer.

The polymer element is preferably adapted to dissolve during the preliminary stages of the process, after resin infusion, during temperature ramping to the temperature for onset of gelling coalescence and/or curing.

The polymer element is substantially independently undetectable in the properties of the cured composition. It is a particular advantage that the polymer element is soluble and may be physically traceless as a separate phase in the cured composition.

The polymer element preferably chain links with the curable resin matrix and contributes to the properties of the resulting cured composite.

In a preferred embodiment of the present invention, the fluid phase of the polymer element undergoes excellent dispersion by solvating effect in the curable component. This is particularly important to the properties of the resulting cured composite product. Raman spectroscopy at co-ordinates throughout the cured composite product shows complete dispersion, with identical scans at each coordinate.

Thus, through control of the cure cycle, the extent of dispersion of the thermoplastic polymer in the curable resin matrix may be controlled to allow for full dispersion or local concentration of the polymer.

Phase separation in the case of a fiber as a polymer element is characterized by complete dissolution. Phase transition e.g. solution of polymer element may be determined or monitored with use of any suitable techniques, for example TEM, SEM, neutron scattering and the like and such techniques may be employed by those skilled in the art to determine suitable polymer element characteristics and curable resin matrix characteristics and processing conditions for commercial production of cured compositions.

The polymer is preferably adapted to undergo phase transition, i.e. to at least partially dissolve in the resin matrix at a temperature Ts in a range at least part of which is less than the cure temperature of the resin matrix Tc. The polymer element may be configured in manner to improve or hinder thermal conductivity and speed or slow transfer of heat into the element to endure rapid or delayed solution thereof.

The polymer element may undergo complete or partial phase transition, e.g. may completely dissolve, or may partially dissolve whereby a portion thereof is dispersed into the matrix and a portion retains its elemental form, either by ensuring that precuring time and temperature are insufficient for complete dissolution or preferably by providing the polymer as a blend or co-polymer with one or more further insoluble polymers, for example in the form of a random or block co-polymer or other blend or derivative with organic or inorganic substrates. By this means the polymer element may be combined with one or more further polymers or other soluble or insoluble organic or inorganic substrates in the cured composition.

The desired level resulting cured composite toughness is obtained by control of the morphology and phase sizes in the thermoset/thermoplastic blend through the chemistries of the thermoplastic polymer and the thermosetting resin precursors, as well as the other parameters of any desired morphology.

Composites formed through the use of the instant resin-soluble thermoplastic veil in a resin infusion process exhibit equivalent toughness to standard prepreg systems formed with equivalent amounts of thermoplastic polymer toughening material.

The percentage of thermoplastic polymer dissolved into the resin matrix between the structural reinforcement fibers provides surprising benefits over toughening material woven into the structural reinforcement fibers or pre-dissolved into the curable resin matrix. This is because while the total amount of thermoplastic toughening material in the system may be the same as a standard prepreg system, the concentration throughout the finished composite may be controlled, and in particular between plies. In the present invention, the dispersion of the thermoplastic polymer may be controlled such that the concentration of thermoplastic toughening material may be highest between the structural reinforcement fiber plies, decreasing in concentration as you approach a structural reinforcement fiber ply, being nominal within the fiber ply.

FIG. 1 illustrates a possible polymer toughening material concentration gradient. This toughening material concentration gradient can provide for the increased toughening between fiber plies, rather than within the structural reinforcement fiber ply.

FIG. 2 shows comparison data for toughness tests among a system with the polymer toughening material interleafed between layers of reinforcement fibers and without. This illustrates the improved toughening capability of the present invention.

Localized toughening is also available through the use of the present invention in the instance where fasteners, openings or other forms of penetrations through the finished composite are required. A weakness in the composite in the form of cracking due to stresses around the penetration is created. It is known in the art that that this weakness is most prominent between the first and second ply, known as first-ply failure. The present invention can provide localized toughening in these failure prone regions, and in particular between the first and second ply through the addition of more layers of non-woven toughening material. This additional toughening material reduces cracking and weakness due to the penetrations.

The concentration profile of dissolved toughening material as discussed above is only increased where additional toughener is added.

Figure 3:
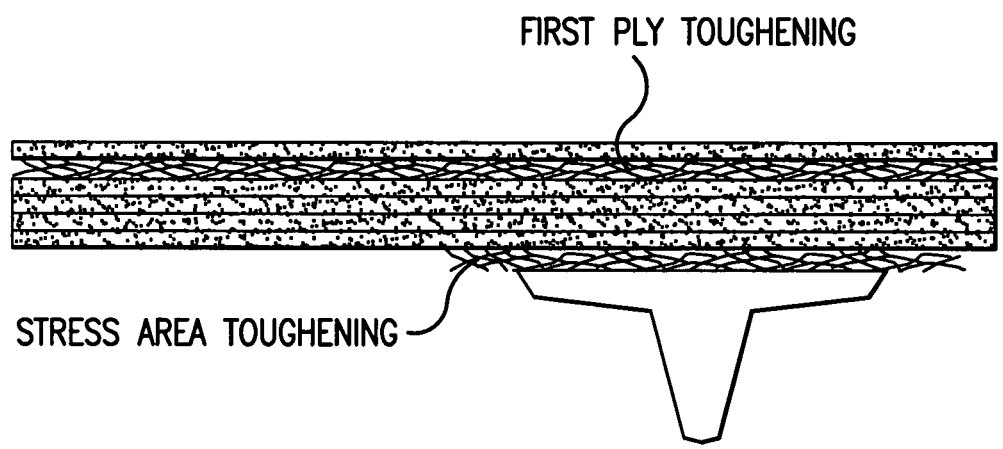
FIG. 3 illustrates the use of the present invention for localized toughening.

FIG. 3 illustrates this localized toughening.

It is further intuitive that this form of localized toughening may be incorporated anywhere with the composite and indeed may be incorporated throughout the composite at a local stress site.

The present invention is further adaptable to chain linking during the cure cycle to further toughen the resulting cured composite. Chain linking components are preferably selected from the formula

wherein B is an oligomer or polymer backbone or is an aliphatic, alicyclic or aromatic hydrocarbon having from 1 to 10 carbon atoms and optionally including heteroatoms N, S, O and the like and optionally substituted, or is C, O, S, N or a transition metal nucleus or is a single bond, n is a whole number integer selected from 2 to 10000 preferably 2 to 8 or 5 to 500 or 500 to 10000.

Accordingly it will be apparent that self reaction between methacrylate ended polymer and chain linking component or between maleimide ended polymer and chain linking component or between oxazoline ended polymer and chain linking component for example is possible and within the scope of the present invention.

In a preferred embodiment, the reactive end group is hydroxy and corresponds to a linking site functionality which is epoxy, whereby reaction thereof produces a hydroxy ether linkage in polymers of increased number average molecular weight having either hydroxy or epoxy end groups as desired. Alternatively, the reactive end group is $NH_2$ and the linking site functionality is anhydride, whereby reaction thereof produces an imide linkage in polymers of increased number average molecular weight having $NH_2$ or anhydride end groups. Alternatively the reactive end group is $NH_2$ and the linking site functionality is maleimide. Mixtures of the above may be employed to produce a mixed architecture including a plurality of reactive end group-linking site combinations.

Preferred linking components include multifunctional epoxy resins, amines and in particular triazines, and anhydrides. Suitable epoxy resins and amines are selected from resins hereinafter defined for matrix resins, and are preferably selected from MY0510, Epikote 828 [$O(CH_2CH) CH_2OPh$]$_2$ $C(CH_3)_2$ and the Cymel class of epoxies including Cymel 0510, benzophenone tetra carboxylic acid dianhydride (BTDA) [$O(CO)_2Ph$]$_2CO$, and maleic anhydride.

Preferably polymer elements comprising two or more polymers comprise a blend or copolymer of amorphous polymers or of amorphous and semi crystalline polymer. This is of particular advantage in enabling the preparation of multi-block compositions having lowered processing temperatures whilst nevertheless retaining excellent product properties such as solvent resistance.

The present invention is particularly beneficial to preforms for resin infusion technology. In a further aspect of the invention there is provided a resin-soluble thermoplastic veil for interposing between structural fiber layers for a curable composition comprising at least one resin-soluble polymer element together with structural elements, preferably reinforcing fibers, wherein the at least one resin-soluble polymer element is present in solid phase and adapted to undergo at least partial phase transition to fluid phase on contact with a resin matrix component of a curable composition in which the element is soluble, at a temperature which is less than the temperature for substantial onset of gelling and/or curing of the curable component.

The structural reinforcement fibers can be of any type of textile structure known in the art for manufacturing composite materials made from reinforcing structural fabrics adaptable to infused liquid resins. Examples of suitable fabric types or configurations include, but are not limited to: all woven fabrics, examples of which include, but are not limited to polar weaves, spiral weaves and uniweaves; all multiaxial fabrics, examples of which include, but are not limited to multi warp knitted fabrics, non crimp fabrics (NCF) and multidirectional fabrics; knitted fabrics braided fabrics; tailored fiber placement fabrics such as for example only fiber placement and embroidered fabrics, all non-woven fabrics, examples of which include but are not limited to mat fabric, felts, veils and chopped strands mats and fabrics that are comprised of combinations thereof.

The fibers that make up the reinforcing structural fabric can be any type of fiber known in the art of composites, examples of which include, but are not limited to spun strands, extruded strands, cast strands, continuous fibers, random fibers, discontinuous fibers, chopped fibers, whiskers, filaments, ribbons, tapes, hollow fibers and combinations thereof. Suitable materials from which the fibers can be made include, but are not limited to those selected from the group consisting of carbon, aramid, quartz, boron, glass, polyethylene, polybenzazole, poly(p-phenylene-2,6-benzobisoxazole) polybenzothiazole alumina, zirconia, silicon carbide, Poly {2,6-diimidazol [4,5-b: 4's'-e] pyridinylene-1, 4 (2,5-dihydroxy) phenylene} (PIPD commercially available from AkZO Nobel Central Research, The Netherlands), graphite and basalt.

and combinations thereof.

The structural reinforcement fiber layers used in conjunction with the present invention may be prepared in continuous manner for example as a roll of fabric which may be tailored by stitching and weaving in desired manner.

Structural reinforcement fibers as hereinbefore defined can be short or chopped typically of mean fiber length not more than 2 cm, for example about 6 mm. Alternatively, and preferably, the fibers are continuous and may, for example, be unidirectionally-disposed fibers or a woven fabric, i.e. the composite material of structural reinforcement fibers and resin matrix forms a prepreg. Combinations of both short and/or chopped fibers and continuous fibers may be utilized. The fibers may be sized or unsized.

Structural reinforcement fibers are typically at a concentration of 5 to 35; preferably at least 20% by weight of the prepreg. For structural applications, it is preferred to use continuous fiber for example glass or carbon, especially at 30 to 70, more especially 50 to 70% by volume.

The structural reinforcement fiber can be organic, especially of stiff polymers such as poly paraphenylene terephthalamide, or inorganic. Among inorganic fibers glass fibers such as "E" or "S" can be used, or alumina, zirconia, silicon carbide, other compound ceramics or metals. A very suitable reinforcing fiber is carbon, especially as graphite. Graphite fibers which have been found to be especially useful in the invention are those supplied by Cytec Carbon Fibers under the trade designations T650-35, T650-42, T40/800 and T300; those supplied by Toray under the trade designations T300, T700, T800-HB, and T1000; and those supplied by Hexcel under the trade designations AS4, AU4, AS7, IM 8 and IM 7, and HTA; and those supplied by Tobo-Tenax under the trade designations HTA, HTS and IMS fibers.

Organic or carbon fiber is preferably unsized or is sized with a material that is compatible with the curable composition according to the invention, in the sense of being soluble in the liquid curable composition without adverse reaction or of bonding both to the structural reinforcement fiber and to the thermoset/thermoplastic curable composition. In particular, carbon or graphite fibers that are unsized or are sized with epoxy resin precursor are preferred. Inorganic fiber preferably is sized with a material that bonds both to the structural reinforcement fiber and to the curable composition.

The curable resin matrix composition may be any suitable resin known for use in the art that is preferably a liquid or a paste at ambient temperatures and is preferably selected in conjunction with the selection of material for use as the resin-soluble thermoplastic polymer so as to completely dissolve the resin-soluble thermoplastic polymer when elevated to a temperature that is less than or equal to the curing temperature for the resin, but below the melt temperature of the resin-soluble thermoplastic polymer. Thermosetting resins are particularly preferred.

Preferably, the curable resin matrix composition is an epoxy resin and can be selected from any known epoxy resin suitable to be infused into a structural reinforcement fabric for composite manufacture.

The curable resin matrix composition is preferably selected from the group consisting of an epoxy resin, an addition-polymerization resin, especially a bis-maleimide resin, a formaldehyde condensate resin, especially a formaldehyde-phenol resin, a cyanate resin, an isocyanate resin, a phenolic resin, polyester resins, vinylester resins and mixtures of two or more thereof, and is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids, cyanate ester resin, benzimidazole, polystyryl pyridine, polyimide or phenolic resin and the like, or mixtures thereof. Examples of addition-polymerization resin are acrylics, vinyls, bis-maleimides, and unsaturated polyesters. Examples of formaldehyde condensate resins are urea, melamine and phenols.

More preferably the curable resin matrix composition comprises at least one epoxy, cyanate ester or phenolic resin precursor, which is liquid at ambient temperature for example as disclosed in EP-A-0311349, EP-A-0365168, EP-A-91310167.1 or in PCT/GB95/01303. Preferably the thermoset is an epoxy or cyanate ester resin or a mixture thereof.

An epoxy resin may be selected from N,N,N'N'-tetraglycidyl diamino diphenylmethane (e.g. "MY 9663", "MY 720" or "MY 721" sold by Ciba-Geigy) viscosity 10-20 Pa s at 50° C.; (MY 721 is a lower viscosity version of MY 720 and is designed for higher use temperatures); N,N,N',N-tetraglycidyl-bis(4-aminophenyl)-1,4-diiso-propylbenzene (e.g. Epon 1071 sold by Shell Chemical Co.) viscosity 18-22 Poise at 110° C.; N,N,N',N'-tetraglycidyl-bis(4-amino-3,5-dimethylphenyl)-1-,4-diisopropylbenzene, (e.g. Epon 1072 sold by Shell Chemical Co.) viscosity 30-40 Poise at 110° C.; triglycidyl ethers of p-aminophenol (e.g. "MY 0510" sold by Ciba-Geigy), viscosity 0.55-0.85 Pa s at 25° C.; preferably of viscosity 8-20 Pa at 25° C.; preferably this constitutes at least 25% of the epoxy components used; diglycidyl ethers of bisphenol A based materials such as 2,2-bis(4,4'-dihydroxy phenyl) propane (e.g. "DE R 661" sold by Dow, or "Epikote 828" sold by Shell), and Novolak resins preferably of viscosity 8-20 Pa s at 25.degree. C.; glycidyl ethers of phenol Novolak resins (e.g. "DEN 431" or "DEN 438" sold by Dow), varieties in the low viscosity class of which are preferred in making compositions according to the invention; diglycidyl 1,2-phthalate, e.g. GLY CEL A-100; diglycidyl derivative of dihydroxy diphenyl methane (Bisphenol F) (e.g. "PY 306" sold by Ciba Geigy) which is in the low viscosity class. Other epoxy resin precursors include cycloaliphatics such as 3',4'-epoxycyclohexyl-3,-4-epoxycyclohexane carboxylate (e.g. "CY 179" sold by Ciba Geigy) and those in the "Bakelite" range of Union Carbide Corporation.

A cyanate ester resin may be selected from one or more compounds of the general formula NCOAr(YxArm)qOCN and oligomers and/or polycyanate esters and combinations thereof wherein Ar is a single or fused aromatic or substituted aromatics and combinations thereof and therebetween nucleus linked in the ortho, meta and/or para position and x=0 up to 2 and m and q=0 to 5 independently. The Y is a linking unit selected from the group consisting of oxygen, carbonyl, sulphur, sulphur oxides, chemical bond, aromatic linked in ortho, meta and/or para positions and/or $CR_2$ wherein $R_1$ and $R_2$ are hydrogen, halogenated alkanes, such as the fluorinated alkanes and/or substituted aromatics and/or hydrocarbon units wherein said hydrocarbon units are singularly or multiply linked and consist of up to 20 carbon atoms for each $R_1$ and/or $R_2$ and $P(R_3R_4R'_4R_5)$ wherein $R_3$ is allyl, aryl alkoxy or hydroxy, $R'_4$ may be equal to $R_4$ and a singly linked oxygen or chemical bond and $R_5$ is doubly linked oxygen or chemical bond or $Si(R_3R_4R'_4R_6)$ wherein $R_3$ and $R_4$, $R'_4$ are defined as in $P(R_3R_4R'_4R_5)$ above and $R_5$ is defined similar to $R_3$ above. Commercially available cyanate esters include cyanate esters of phenol/formaldehyde derived Novolaks or dicyclopentadiene derivatives thereof, an example of which is XU71787 sold by the Dow Chemical Company, and low viscosity cyanate esters such as L10 (Lonza, Ciba-Geigy, Bisphenol derived).

A phenolic resin may be selected from any aldehyde condensate resins derived from aldehydes such as methanal, ethanal, benzaldehyde or furfuraldehyde and phenols such as phenol, cresols, dihydric phenols, chlorphenols and $C_1$-9 alkyl phenols, such as phenol, 3- and 4-cresol (1-methyl, 3- and 4-hydroxy benzene), catechol (2-hydroxy phenol), resorcinol (1,3-dihydroxy benzene) and quinol (1,4-dihydroxy benzene). Preferably phenolic resins comprise cresol and novolak phenols.

Suitable bismaleimide resins are heat-curable resins containing the maleimido group as the reactive functionality. The term bismaleimide as used herein includes mono-, bis-, tris-, tetrakis-, and higher functional maleimides and their mixtures as well, unless otherwise noted. Bismaleimide resins with an average functionality of about two are preferred. Bismaleimide resins as thus defined are prepared by the reaction of maleic anhydride or a substituted maleic anhydride such as methylmaleic anhydride, with an aromatic or aliphatic di- or polyamine. Examples of the synthesis may be found, for example in U.S. Pat. Nos. 3,018,290, 3,018,292, 3,627,780, 3,770,691 and 3,839,358. The closely related nadicimide resins, prepared analogously from a di- or polyamine but wherein the maleic anhydride is substituted by a Diels-Alder reaction product of maleic anhydride or a substituted maleic anhydride with a diene such as cyclopentadiene, are also useful. As used herein and in the claims, the term bismaleimide shall include the nadicimide resins.

Preferred di- or polyamine precursors include aliphatic and aromatic diamines. The aliphatic diamines may be straight chain, branched, or cyclic, and may contain heteroatoms. Many examples of such aliphatic diamines may be found in the above cited references. Especially preferred aliphatic diamines are hexanediamine, octanediamine, decanediamine, dodecanediamine, and trimethylhexanediamine.

The aromatic diamines may be mononuclear or polynuclear, and may contain fused ring systems as well. Preferred aromatic diamines are the phenylenediamines; the toluenediamines; the various methylenedianilines, particularly 4,4'-methylenedianiline; the naphthalenediamines; the various amino-terminated polyarylene oligomers corresponding to or analogues to the formula $H_2N—Ar[X—Ar]_nNH_2$, wherein each Ar may individually be a mono- or polynuclear arylene radical, each X may individually be —O—, —S—, —$CO_2$—, —$SO_2$—, —O—CO—, $C_1$-$C_{10}$ lower alkyl, $C_1$-$C_{10}$ halogenated alkyl, $C_2$-$C_{10}$ lower alkyleneoxy, aryleneoxy, polyoxyalkylene or polyoxyarylene, and wherein n is an integer of from about 1 to 10; and primary aminoalkyl terminated di- and polysiloxanes.

Particularly useful are bismaleimide "eutectic" resin mixtures containing several bismaleimides. Such mixtures generally have melting points which are considerably lower than the individual bismaleimides. Examples of such mixtures may be found in U.S. Pat. Nos. 4,413,107 and 4,377,657. Several such eutectic mixtures are commercially available.

Preferably the resin-soluble polymer element and dissolving matrix are selected as a "solution pair" providing not only dissolution at desired time and temperature, but also good matrix injection, dispersion, morphology such as phase separation and traceless dispersion if desired, and the like. Suitable solution pairs include a low viscosity curable resin matrix composition for good injection and rapid dissolution, and compatibility with the resin-soluble polyer element. Alternatively or additionally less compatible resins may be used if it is desired to introduce phase separation for enhanced mechanical properties. Combinations of different viscosity resins may be used each contributing several of the above properties where these are not provided by a single resin.

A curing agent may also be introduced in combination with the present invention such as any known thermoset curing agent, for example epoxy curing agents, as disclosed in EP-A-0 311 349, EP-A 91310167.1, EP-A-0 365 168 or in PCT/GB95/01303, which are incorporated herein by reference, such as an amino compound having a molecular weight up to 500 per amino group, for example an aromatic amine or a guanidine derivative. Particular examples are 3,3'- and 4-,4'-diaminodiphenylsulphone, (available as "DDS" from commercial sources), methylenedianiline,bis(4-amino-3,5-dimethylphenyl)-1,4diisopropylbenzene (available as EPON 1062 from Shell Chemical Co); bis(4-aminophenyl)-1,4-diisopropylbenzene (available as EPON 1061 from Shell Chemical Co); 4-chlorophenyl-N,N-dimethyl-urea, eg Monuron; 3,4-dichlorophenyl-N,N-dimethyl-urea, eg Diuron and dicyanodiamide (available as "Amicure CG 1200 from Pacific Anchor Chemical). Other standard epoxy curing agents such as aliphatic diamines, amides, carboxylic acid anhydrides, carboxylic acids and phenols can be used if desired. If a novolak phenolic resin is used as the main thermoset component a formaldehyde generator such as hexamethylenetetraamine (HMT) is typically used as a curing agent.

A catalyst may be introduced into a preferred embodiment of the present invention. In this case, the curing catalyst employed preferably comprises a Lewis acid having amine functionality, instead of in addition to conventional catalysts.

Preferably the catalyst is of the formula:

$$LX_nR$$

where $LX_n$ is a Lewis acid and R is an amine. Preferably L is selected from Groups IIb, IIIb, VIII of the Periodic Table of the Elements and X is a halogen.

Preferred catalysts include $BF_3$, $BCl_3$, $AlF_3$, $FeF_3$, $ZnF_2$ as Lewis acid component and primary or secondary aliphatic or aromatic amine such as monoethyl amine (mea), dimethylamine (dma), benzylamine (bea) or piperidine.

A composite may be manufactured using the present invention, preferably through resin infusion obtained by a method known in the art wherein a support structure comprising structural reinforcement fibers (dry) and the at least one resin-soluble thermoplastic veil element is placed into a bag, mold or tool to provide a preform and a curable resin matrix composition is injected/infused directly into the combined structural reinforcement fibers and veil.

The preform is preferably formed, injected/infused and cured by processing techniques such as Resin Transfer Molding (RTM), Liquid Resin Infusion (LRI), Resin Infusion Flexible Tooling (RIFT), Vacuum Assisted Resin Transfer Molding (VARTM), Resin Film Infusion (RFI) and the like as hereinbefore referred.

Suitably the process includes a preliminary stage of infusion of curable resin matrix composition at reduced pressure, followed by a degassing stage drawing off air for reducing voidage. Traditionally the degassing is carried out under elevated pressure.

The resin-soluble thermoplastic veil element remains in solid form during the initial stages of resin infusion and degassing, at ambient or reduced pressure, whereafter the polymer fibers dissolve and disperse without trace allowing the fluid phase components to compact, without external applied pressure, prior to onset of gelling coalescence and curing. If external pressure is applied, the performance is simply enhanced, however it is a particular advantage that this configuration allows for curing large panels without the need for an autoclave or the like.

Suitably resin-soluble thermoplastic fibers are present in an amount of 2 to 50 wt %, preferably 2 to 40 wt %, more preferably 4 to 16 wt % in this embodiment.

Additionally the configuration has advantages during resin infusion, whereby channels remain open and clear to assist in rapid and uniform resin infusion throughout the panel.

Suitably, the process of the invention comprises subjecting to elevated temperature in the range up to 300° C. for example 60° C. to 200° C., more preferably 75° C. to 150° C. for a period of up to 45 minutes, preferably 0.5 to 35 minutes to effect phase transition. Temperatures in the range 100° C.-150° C. are particularly suitable for phase transition of readily soluble polymer elements for example of low MW, present in readily soluble concentration in an effective curable component solvent, and in the range 150° C. to 300° C. for less readily soluble polymer elements. Suitable elevated temperature is selected in a desired range to effect phase transition in a desired time, for example a given flexible polymer element may be subjected to elevated temperature in the range 135° to 170° C. for 2-10 minutes, 125 to 135° C. for 5-30 minutes or 105° to 125° C. for 10-40 minutes.

Phase transition may be at ambient or elevated pressure corresponding to the desired injection, degassing and curing conditions.

The process includes subjecting to further elevated temperature after phase transition to cause onset of gelling or curing. Gelling may be at temperatures in the range corresponding to pre-cure in known manner. Gelling is preferably followed by further elevated temperature cure, or the gelled composition may be cooled for later curing, for example if gel or cure is in an autoclave, or mold, the composition may be removed from the autoclave or mold and cure continued at ambient pressure in regular oven.

Gelling or curing is suitably carried out by known means at elevated temperature and pressure for a suitable period, including temperature ramping and hold as desired. A suitable gelling or cure cycle corresponds to that for a conventional composition comprising the same component types and amounts and reference is made to the description and example illustrating calculation of amount of flexible polymer element present in the composition.

Preferably cure is at temperature in the range 150° C. to 400° C. for 1-4 hours, for example. Additionally the process may include post curing at suitable conditions to enhance properties such as Tg and the like.

Gelling or curing may be with use of catalysts as hereinbefore defined, whereby temperature increase causes activation, and cooling below activation temperature halts curing.

The process may be monitored in real time but preferably a suitable reaction time and temperature is predetermined for a given composition, for example by preparing samples and analyzing solution and dispersion after completion of gelling or cure, for example by use of Raman spectroscopy or the like.

The invention is now illustrated in non-limiting manner with reference to the following Examples.

EXAMPLES

Example 1

Veil Manufacturing 54 tex fibers made from a PES polymer are chopped to an average fiber length of 8 mm using a rotary blade chopper. The chopped fibers are then dispersed by hand on a release film and pressed between a press hot platens at 180° C. for 1 hour with a 15 bar piston pressure. The platens are then cooled down to 60° C. and the resulting product is extracted. The product has a dimension of 15×15" and an AW of 60 gsm. The veil is stable and handleable for processing purposes during manufacture.

Example 2

Veil Dissolution

A sample of veil made in the previous example (AW=60 gsm) weighing 10 grams is combined with 30 g of Cycom™ 977 20 resin by dipping the veil into the resin. The veil/resin combination is then placed in an oven at 130° C. for 1 hour. The resulting product is then observed under a microscope. The microscopic observation shows a homogeneous solution without visible traces of undissolved fibers or high concentration of thermoplastic.

Example 3

Composite Manufacturing

Figure 4:
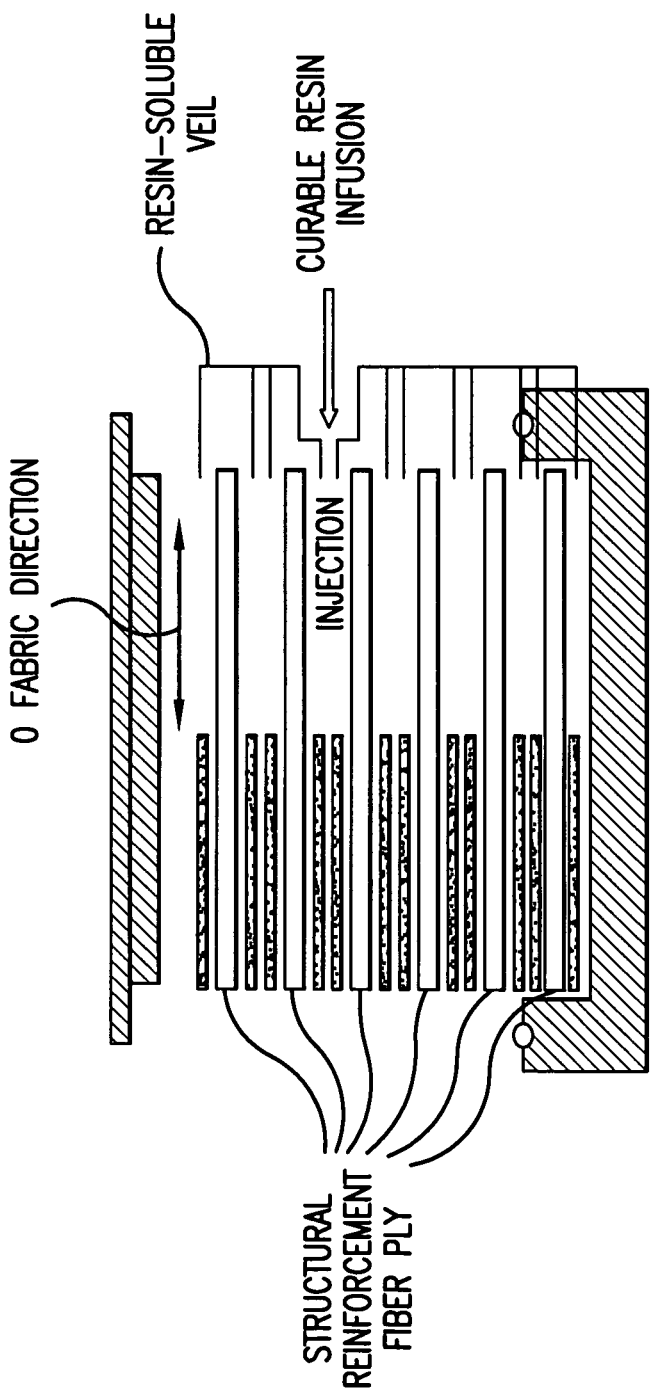
FIG. 4 illustrates the manufacturing of a composite incorporating the resin-soluble thermoplastic veil of the present invention with resin infusion technology.
Figure 5:
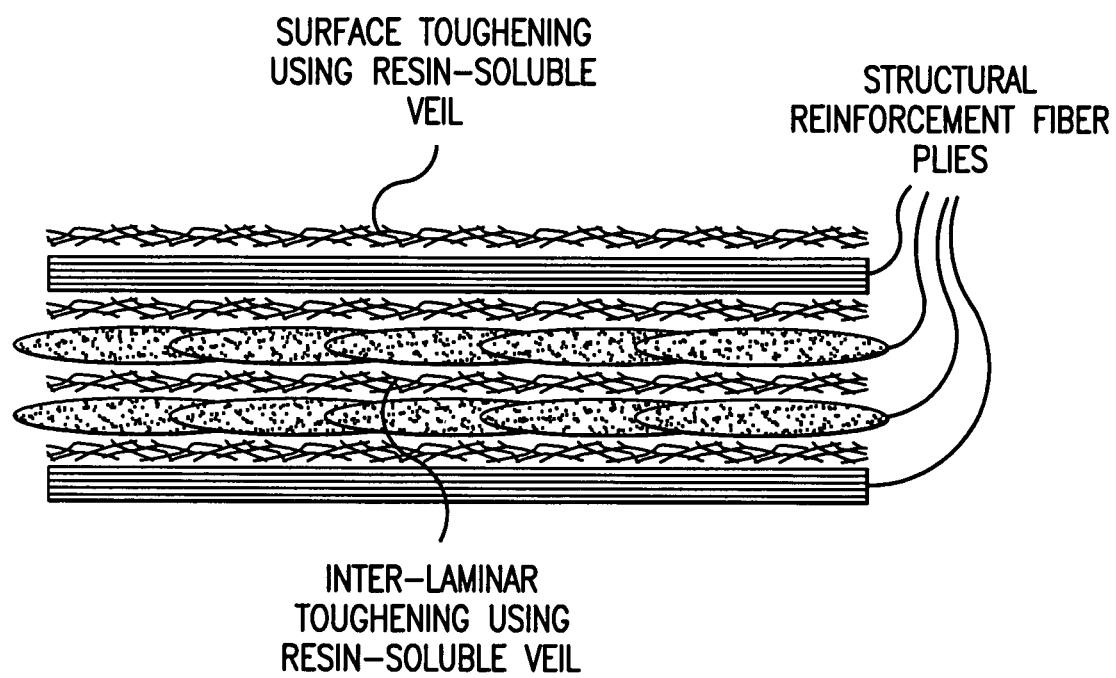
FIG. 5 illustrates the detailed lay up of the resin-soluble thermoplastic veil of the present invention interposed between structural reinforcement fiber plies.

Layers of a HTA-6K-370 GSM 5HS carbon fabric were interleafed with non-woven fabrics to manufacture RTM panels with a Vf=55% and a target thermoplastic content of 25% wt in the resin (54 gsm in the fabric). FIG. 4 illustrates this resin infusion process while FIG. 5 illustrates the veil and reinforcement fiber orientation.

The results show that the insertion of the non-woven veil provides compression after impact (CAI) testing numbers equivalent to traditional toughened prepreg systems using the non-woven resin-soluble veil. The key mechanical properties were tested and the results are reported in Table 1 below:

TABLE 1

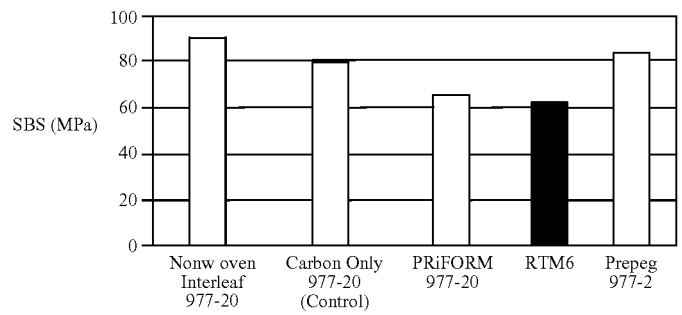

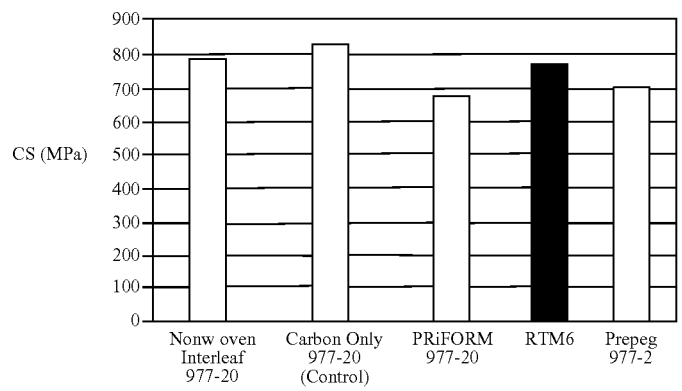

TABLE 1-continued

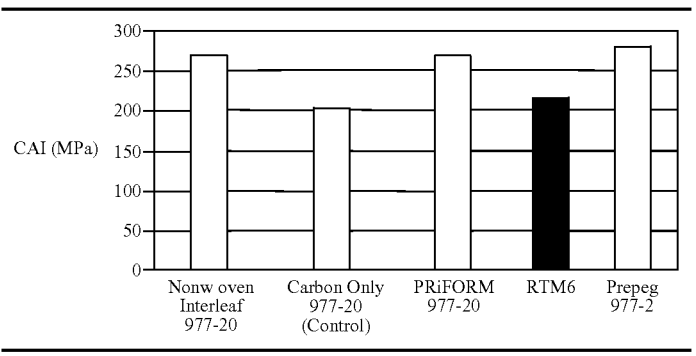

Example 4

Stabilization of a Preform

A resin-soluble thermoplastic PES polymer veil was adhered to a carbon reinforcement fabric by contacting the PES polymer veil to the carbon reinforcement fiber to form a stabilized preform for resin infusion.

Figure 6:
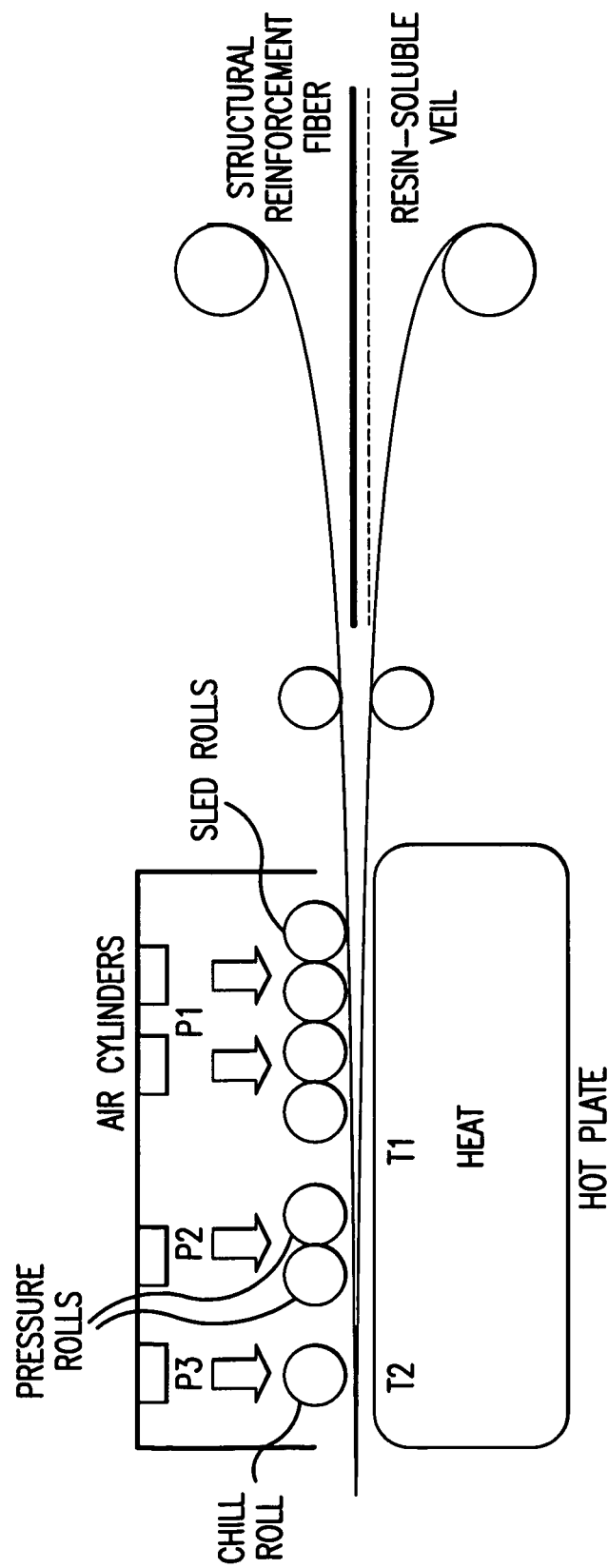
FIG. 6 illustrates the process for stabilizing a structural reinforcement fiber ply into a stable preform using the resin-soluble thermoplastic veil of the present invention.

A layer of PES polymer veil and a layer of carbon reinforcement fabric were fed between pressure rollers and a heat plate. FIG. 6 illustrates this process for stabilization of the preform using the thermoplastic polymer veil of the present invention. The line speed of the process was about 1.7 ft/min, the heat rollers were at a temperature, $T_1$, of about 163° C.; and the chill roller was at a temperature, $T_2$, of about 21° C. All of the rollers had an applied pressure, $P_1$, $P_2$, and $P_3$, respectively, of 100 psi.

This process provided in-plane stabilization of the preform carbon fiber/thermoplastic polymer veil and allowed for subsequent heat bonding, stabilization, and preforming of dry fabric stacks prior to composite manufacturing using resin infusion techniques.

What is claimed is:

1. A thermoplastic toughening element for resin infusion manufacturing of composite consisting of
    a layer of a plurality of resin-soluble thermoplastic fibers randomly oriented and adhered to one another into a veil consisting of the resin soluble thermoplastic fibers with an areal weight of about 5 to about 80 gsm
    wherein the toughening element is interposed between and in direct contact with adjacent plies consisting of a structural reinforcement fiber
    wherein the resin-soluble thermoplastic fibers are in a solid phase and undergo at least partial phase transition to a fluid phase on contact with a curable resin matrix in which the thermoplastic fibers are soluble at a first temperature for substantial dissolution, which is less than a second temperature for substantial onset of curing of the curable resin matrix, and
    wherein the concentration of toughening element is highest in the resin matrix between the adjacent plies and decreases in concentration as the matrix approaches the plies.

2. The toughening element of claim 1 wherein the fibers comprise a first resin-soluble thermoplastic material and a second resin-soluble thermoplastic material.

3. The toughening element of claim 2 wherein the first resin-soluble thermoplastic material and the second resin-soluble thermoplastic material are the same.

4. The toughening element of claim 2 wherein the first material and the second material are different.

5. The toughening element of claim 1 wherein the resin-soluble thermoplastic is selected from the group consisting of cellulose derivatives, polyester, polyamide, polyimide, polycarbonate, polyurethane, poly(methyl methacrylate), polystyrene, polyaromatics; polyesteramide, polyamideimide, polyetherimide, polyaramide, polyarylate, polyacrylate, poly (ester) carbonate, poly(methyl methacrylate/butyl acrylate), polysulphone, polyethersulphone, polyetherethersulphone polyethersulphone-etherketone, and copolymers and combinations thereof.

6. The toughening element of claim 1 wherein the fibers solubilize in a curable resin matrix at a first temperature less than a second cure temperature of the curable resin matrix.

7. The toughening element of claim 6 wherein the solubilized fibers chain link with the curable resin matrix at the second cure temperature of the curable resin matrix.

8. The toughening element of claim 1 wherein the fibers carry modifiers.

9. A toughening element for a curable composition consisting of a veil consisting of resin soluble thermoplastic fibers in a solid phase interposed between and in direct contact with layers consisting of reinforcement fibers
    wherein the toughening element undergoes at least partial phase transition to a fluid phase on contact with a curable composition in which it is soluble, at a first temperature for substantial dissolution, which is less than a second temperature for substantial onset of gelling and/or curing of the curable composition and which first temperature is less than a third temperature for substantial melting of the resin-soluble thermoplastic veil, and
    wherein the concentration of toughening element is highest in the resin matrix between the adjacent plies and decreases in concentration as the curable composition approached the layers of reinforcement fibers.

10. The toughening element of claim 9 wherein the layers of reinforcement fibers form a preform and wherein the resin-soluble thermoplastic veil stabilizes the preform.

11. A preform for composite manufacturing comprising:
    a structural component consisting of a plurality of structural reinforcement fiber plies;
    a toughening element consisting of a plurality of resin-soluble thermoplastic fibers randomly oriented and adhered to one another into a veil interposed between and in direct contact with adjacent plies of structural reinforcement fibers;
    wherein the toughening element is in the form of a nonwoven veil with an areal weight of about 5 to about 80 gsm in contact with the adjacent plies of structural reinforcement fiber in the structural component,
wherein the toughening element is in a solid phase and substantially remains in a soluble phase when contacted with a curable resin matrix at a first temperature for infusion, which is less than a second temperature for substantial dissolution of the toughening element, and
wherein the concentration of toughening element is highest in the resin matrix between the adjacent plies and decreases in concentration as the matrix approaches the plies.

12. The preform for composite manufacturing of claim 11 wherein the structural component is provided in the form of a plurality of adjacent reinforcement fiber layers and wherein the toughening element is provided in the form of a plurality of veils interposed between pairs of adjacent reinforcement fiber layers.

13. The preform for composite manufacturing of claim 11 adapted for resin infusion.

14. The preform for composite manufacturing of claim 11 wherein the preform is stabilized.

15. The preform for composite manufacturing of claim 11 wherein the toughening element is in a solid phase and substantially remains in a soluble phase when contacted with a curable resin matrix at a first temperature for infusion, which is less than a second temperature for substantial dissolution of the toughening element.

16. The preform for composite manufacturing of claim 11 wherein the toughening element substantially reacts with the curable resin matrix at the second temperature.

17. The toughening element of claim 1 wherein the adjacent plies of a structural reinforcement fiber are in the form of a woven or fabric structure.

18. The toughening element of claim 1 wherein the adjacent plies of a structural reinforcement fiber are in the form of unwoven or unidirectional fibers.

* * * * *